Jan. 18, 1949.  L. A. MAJNERI  2,459,664
HYDRAULIC VALVE
Filed Dec. 11, 1944

INVENTOR.
LUDWIG A. MAJNERI
BY
Whittemore Hulbert & Belknap
ATTORNEYS

Patented Jan. 18, 1949

2,459,664

UNITED STATES PATENT OFFICE 2,459,664

HYDRAULIC VALVE

Ludwig A. Majneri, Grosse Pointe, Mich., assignor to The Warner Aircraft Corporation, Detroit, Mich., a corporation of Michigan Application December 11, 1944, Serial No. 567,659

5 Claims. (Cl. 137—153)

This invention relates to power valve assemblies and refers more particularly to valve assemblies for controlling the flow of braking fluid under pressure to the actuator of a brake for applying the same.

One type of hydraulic braking system, with which valve assemblies of the above character are especially adapted for use, comprises in general a hydraulic brake actuator, a manually operable pressure producing device, a reservoir for a hydraulic brake fluid and an accumulator containing a hydraulic brake fluid under relatively high pressure. In systems of the above type, it is preferred to connect the hydraulic brake actuator to the accumulator in order to increase the rate of flow of the hydraulic braking fluid to the actuator and thereby expedite application of the brake associated with the actuator. However, the pressure of the fluid in the accumulator is usually somewhat higher than actually required to operate the brake and frequently exceeds the pressure for which the brake is designed. Accordingly it has been proposed to introduce a valve in the system which operates to alternatively connect the brake actuator to the reservoir and accumulator as the pressure falls below and rises above a predetermined value.

The reducing valve is usually connected either directly or indirectly to the manually operable pressure producing device for operation by the latter to initially connect the brake actuator to the accumulator and it is an object of this invention to provide a valve of the above type characterized in that it may be operated by the application of a relatively small pressure to connect the hydraulic brake actuator to the accumulator.

The above as well as other objects will be made more apparent as this description proceeds, especially when considered in connection with the accompanying drawing, wherein.

Figure 1:
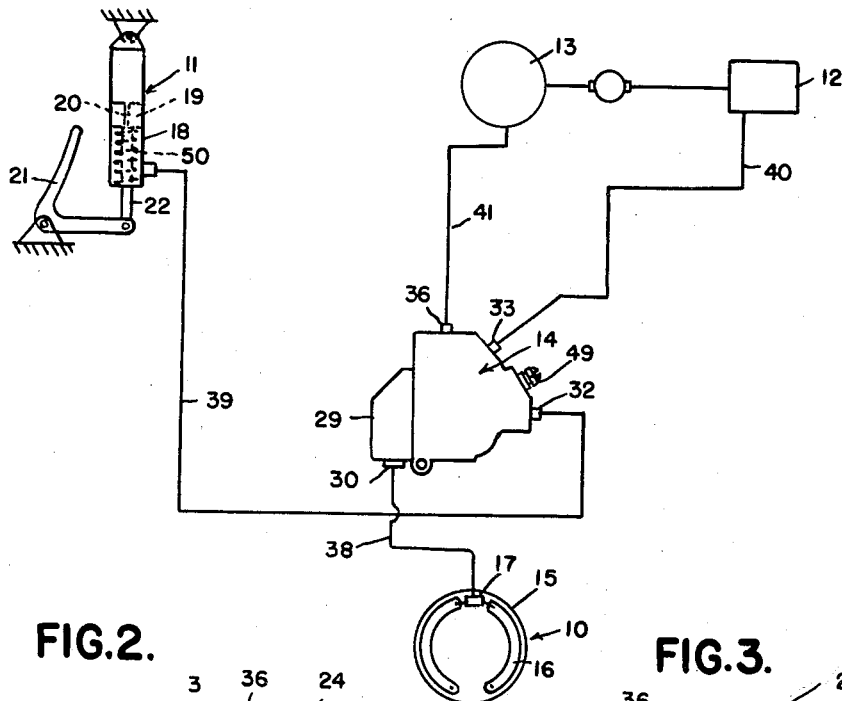
Figure 1 is a diagram illustrating a hydraulic brake system embodying a valve constructed in accordance with this invention.
Figure 2:
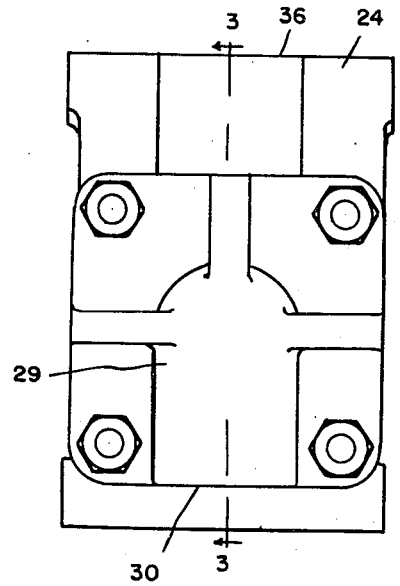
Figure 2 is an end elevation of the valve embodying the features of this invention.

The hydraulic braking system selected herein for the purpose of illustrating the present invention is shown in Figure 1 as comprising a brake 10, a manually operable pressure producing device 11, a reservoir 12 for hydraulic braking fluid, an accumulator 13 and a power valve assembly 14.

The brake 10 may be of any accepted design having a brake drum 15 and having brake friction means 16 suitably supported within the drum 15. The brake friction means 16 is operated to apply the brake by a hydraulic actuator 17 also supported in the drum and positioned between adjacent ends of the brake friction means 16.

The manually operable pressure producing device 11 may be a conventional type of master cylinder and accordingly will not be described in detail herein. Briefly the device 11 comprises a cylinder 18 and a piston 19 supported for sliding movement in the cylinder. The piston is ported as at 20 to enable the passage of hydraulic braking fluid therethrough and is manually moved in a downward direction by an operating lever 21 having one arm connected to the piston through the lower end of the cylinder by a rod 22.

A cap 29 is secured to the end of the body 24 adjacent the reduced end 28 of the chamber 27 and a port 30 is formed in the cap in communication with the reduced end 28 of the chamber. The joint between the cap 29 and the adjacent surface of the body 24 is sealed by a pair of O-ring seals indicated in Figure 3 by the reference character 31.

The opposite or enlarged end of the chamber 27 communicates with a port 32 formed in the body 24 and also communicates with an outlet port 33 formed in the body 24. It will be noted from Figure 3 that the outlet port 33 communicates with an annular groove 34 formed in the body 24 around the sleeve 26 in registration with radial ports 35, which open into the enlarged portion of the chamber 27. An inlet port 36 is formed in the body between the ports 30 and 33. The inlet port 36 communicates with the reduced portion 28 of the chamber 27 through the radial ports 37.

Upon reference to Figure 1, it will be noted that the port 30 is connected to the hydraulic brake actuator by a conduit 38 and the port 32 is connected to the lower end of the master cylinder 11 by a conduit 39. The outlet port 33 is connected to the reservoir 12 by a conduit 40 and the inlet port 36 is connected to the accumulator 13 by a conduit 41.

Referring again to Figure 3 of the drawing, it will be noted that a valve member 42 is supported in the chamber 27 for sliding movement in opposite directions. The valve member 42 has a reduced portion 43 which is lapped into the reduced portion 28 of the chamber and is provided with an enlarged head 44 which is lapped into the enlarged portion of the chamber 27. The valve member is normally urged in a direction toward the port 32 by means of a coil spring 45 surrounding the valve in the enlarged portion of the chamber 27 with the opposite ends respectively abutting the head 44 and the radial shoulder 46 formed on the sleeve 26. The reduced end portion 43 of the valve 42 is formed with a chamber 47 open at one end for constant communication with the port 30 and having radial ports 48 alternatively registerable with the inlet and outlet ports 36 and 33 respectively upon movement of the valve member 42 in opposite directions. Filling and bleeding of the hydraulic braking system is accomplished by an adjustable valve 49 in the usual manner.

Figure 3:
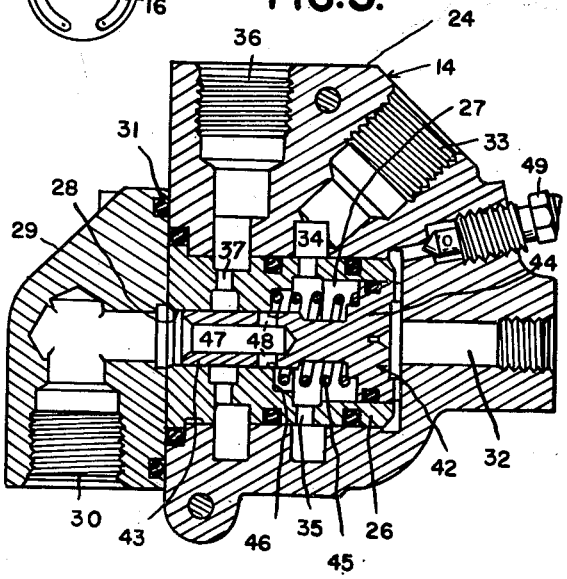
Figure 3 is a sectional view taken substantially on the plane indicated by the line 3—3 of Figure 2.

Assuming that the valve is in the position shown in Figure 3 and that the master cylinder 11 is manually operated by the lever 21 to move the piston 19 in a downward direction, it will be noted that fluid under pressure flows from the lower end of the master cylinder through the conduit 39 to the port 32 in the valve 14. The pressure of this fluid acts upon the enlarged portion or head 44 of the valve member 42 to move the latter to a position wherein the ports 48 register with the inlet port 36. Thus fluid under pressure from the accumulator 13 enters the chamber 47 in the reduced end 43 of the valve and flows through the port 30 to the hydraulic actuator 17. Inasmuch as this fluid is under a relatively high pressure, it follows that the brake actuator is practically instantaneously operated to apply the brake and this is true regardless of the displacement of the system.

When the pressure in the chamber 47 or at the port 30 exceeds the required brake applying pressure, the valve member 42 is moved toward the port 32 to close the inlet port 36 and in the event this pressure continues to rise, the ports 48 are registered with the outlet port 33 to enable fluid under pressure to escape into the reservoir 12. Thus it will be noted that the valve member 42 in effect oscillates back and forth between the outlet and inlet ports as the pressure rises above or falls below a predetermined value.

It will be noted from the above construction that the area of the reduced end of the valve exposed to the fluid under pressure from the accumulator is considerably smaller than the area of the enlarged portion or head 44 of the valve which is exposed to the pressure from the manually operable device 11. This is advantageous because it enables operating the valve to connect the high pressure accumulator to the brake actuator with a relatively small applying pressure on the manually operable lever 21.

When the lever 21 is released the piston 19 in the master cylinder is moved upwardly by the action of a suitable spring 50 and the fluid under pressure in the conduit 39 is reduced. As the fluid under pressure in the conduit 39 is returned to the master cylinder, the spring 45 moves the valve member 42 to the position shown in Figure 3, wherein the port 48 communicates with the reservoir 12 through the outlet port 33 in the valve body 24.

Thus from the foregoing it will be noted that I have provided a relatively simple inexpensive valve assembly which enables connecting the brake actuator to a source of hydraulic fluid under high pressure and which not only operates to maintain the pressure in the actuator at the desired predetermined value but, in addition, enables initial operation of the valve with the application of a relatively small pressure.

What I claim as my invention is:

1. A power valve for hydraulic brake systems comprising a body provided with a cylindrical valve chamber, and having an outlet port, a second port in the body for receiving a hydraulic braking fluid under pressure, a third port in said body for exhausting braking fluid, a fourth port in the body for also receiving a hydraulic braking fluid, and means in the valve chamber responsive to variations in pressure at the first port above and below a predetermined value to alternatively register the first port with the third and second ports, said means comprising a valve member having portions of differential areas slideably mounted in the valve chamber with the portion having the smaller area exposed to the first port and with the portion of greatest area exposed to the fourth port whereby the valve is operated by the fluid pressure acting on the portion of greatest area to establish communication between the first and second ports.

2. A power valve for hydraulic brake systems comprising a body provided with a cylindrical valve chamber and having an outlet port, a second port in the body spaced longitudinally from the first port for receiving a hydraulic braking fluid, a third port in said body between the two ports aforesaid for exhausting a braking fluid, a fourth port in the body between the first and third ports for receiving a braking fluid under a higher pressure than the first source, means in the valve chamber responsive to variations in pressure at the first port above and below a predetermined value to alternatively register the first port with the third and fourth ports, said means comprising a valve member having portions of different areas and slideably mounted in the valve chamber with the portion of smaller area exposed to the first port and with the portion of greatest area exposed to the second port whereby said valve is operated by the fluid pressure acting on the portion of greatest area to establish communication between the first and fourth ports, and a spring normally urging said valve member to a position wherein the first port and fourth ports are out of registration with each other.

3. A power valve for hydraulic brake systems comprising a body provided with a cylindrical valve chamber and having an outlet port at one end of the chamber, a port at the opposite end of the chamber adapted for receiving a hydraulic braking fluid, spaced inlet and outlet ports in said body between the first and second ports for respectively receiving a braking fluid under a higher pressure than the first source and for exhausting braking fluid, and means in the valve chamber responsive to variations in pressure at the first port above and below a predetermined value to alternatively register the first port with the inlet and outlet ports, said means comprising a longitudinally movable valve member having portions of differential areas positioned within the valve chamber with the portion of smaller area exposed to said first port and with the portion of greatest area exposed to said second port.

4. A power valve for hydraulic brake systems comprising a body provided with a cylindrical chamber and having an outlet port, a second port in said body at the opposite end of the chamber for receiving a braking fluid, an inlet port in the body between the ports aforesaid for receiving a fluid under a higher pressure than the first source, an outlet port in said body between the inlet port and second port for exhausting braking fluid, a valve member longitudinally movable within said chamber and having a chamber open at one end for connection with the first port, the chamber in said valve member having a port therein, said valve member being responsive to variations in pressure in the latter chamber above and below a predetermined value to alternatively register the latter port with the outlet port and inlet port, and a head on the end of the valve adjacent the second port having an area substantially greater than the area of the valve exposed to the first port and responsive to fluid pressure flowing through the second port for moving said valve member to register the port in the second chamber with the inlet port.

5. A power valve for hydraulic brake systems comprising a body provided with a cylindrical valve chamber having longitudinally spaced portions of different diameters, an outlet port communicating with the reduced portion of the chamber, a second port for receiving a hydraulic fluid under pressure and also communicating with the reduced portion of the valve chamber, a third port in the body for exhausting hydraulic braking fluid, a fourth port for also receiving hydraulic fluid and communicating with the enlarged portion of the chamber, a valve member supported in the chamber for sliding movement in opposite directions and having a reduced portion movable in the reduced portion of the chamber and operable to alternatively connect the first port with the second and third ports upon movement of the valve member in opposite directions, and an enlargement on said valve slidable in the enlarged portion of the chamber and exposed to the fluid under pressure entering the said enlarged portion of the chamber through the fourth port.

LUDWIG A. MAJNERI.

REFERENCES CITED

The following references are of record in the file of this patent:

UNITED STATES PATENTS

| Number | Name | Date |
|---|---|---|
| 923,568 | Nicola | June 1, 1909 |
| 1,962,857 | Cash | June 12, 1934 |
| 2,012,258 | Christensen | Aug. 27, 1935 |
| 2,212,913 | Breeze | Aug. 27, 1940 |
| 2,244,317 | Rockwell | June 3, 1941 |
| 2,306,346 | Rockwell | Dec. 22, 1942 |
| 2,394,343 | Varech | Feb. 5, 1946 |